Feb. 5, 1946. C. A. GOZA 2,394,050
SHOPPING BAG CARRIER
Filed March 13, 1944
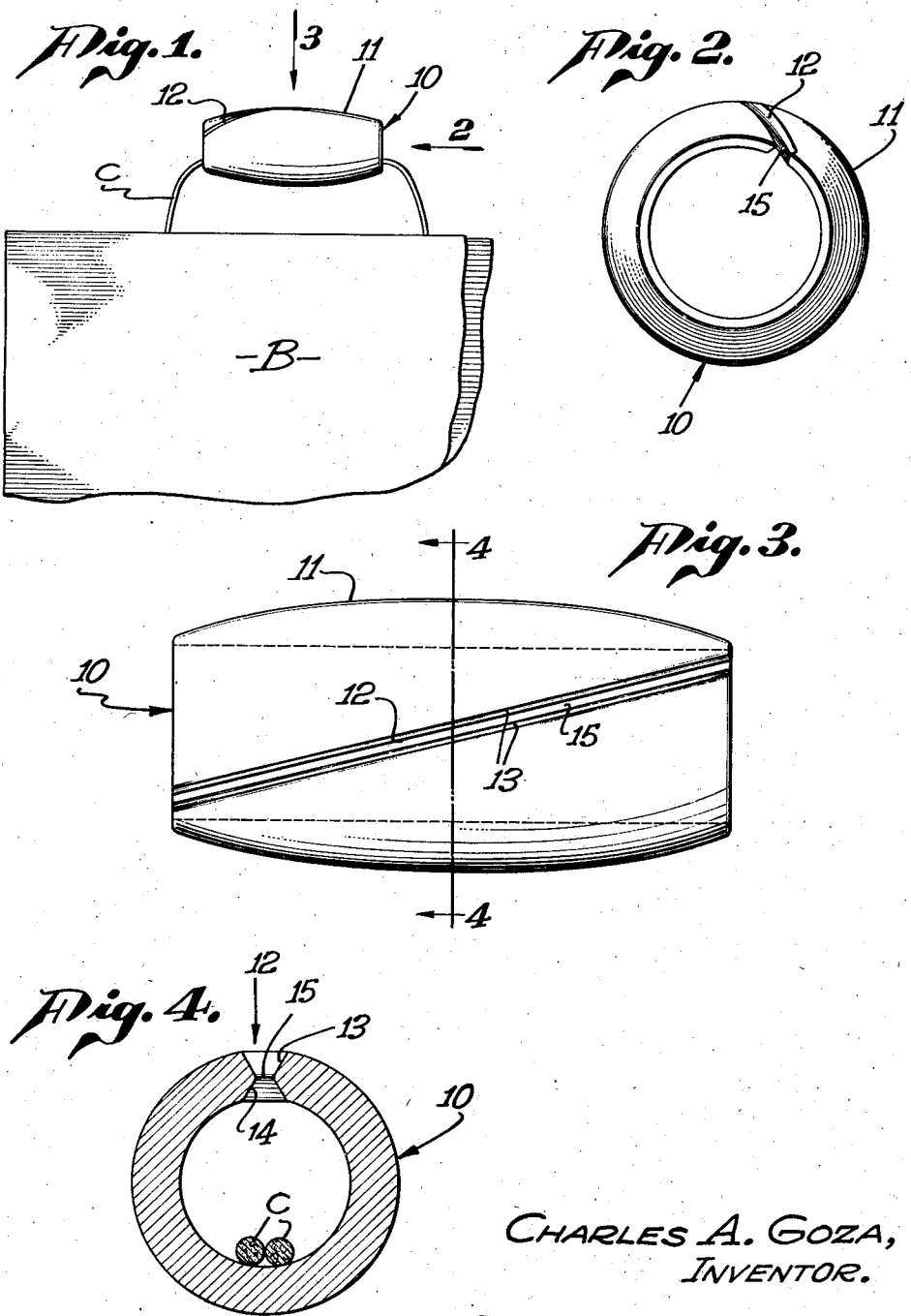
CHARLES A. GOZA,
INVENTOR.
BY Hazard and Miller
ATTORNEYS.

Patented Feb. 5, 1946

2,394,050

UNITED STATES PATENT OFFICE 2,394,050

SHOPPING BAG CARRIER

Charles A. Goza, Los Angeles, Calif., assignor of one-half to Harry E. Herbert, Los Angeles, Calif., and one-half to George F. Notterman, Alhambra, Calif.

Application March 13, 1944, Serial No. 526,293

5 Claims. (Cl. 229—54)

This invention relates to a shopping bag carrier.

An object of the invention is to provide a very simple, durable and economically constructed handle which can be easily applied to the carrying or suspending cords of a shopping bag.

More specifically, an object of the invention is to provide a shopping bag carrier consisting of a tubular body which provides the handle and which has formed therein a helically arranged slot extending from end to end thereof. The sides of the slot diverging both outwardly and inwardly to facilitate the passage of the cords of a shopping bag therethrough. By means of the helically arranged slot, when the handle is applied to the cords of a shopping bag, danger of the cords inadvertently slipping out of the slot is effectively eliminated. Consequently no attention need be placed on whether the slot is uppermost or lowermost when the handle is applied in position.

With the foregoing and other objects in view which will be made manifest from the following detailed description and specifically pointed out in the appended claims, reference is had to the accompanying drawing for an illustrative embodiment of the invention, wherein Fig. 1 is a partial view in side elevation of a shipping bag illustrating the carrier embodying the present invention as having been applied thereto;

Fig. 2 is a view in end elevation of the carrier and may be regarded as taken in the direction of the arrow 2 upon Fig. 1;

Fig. 3 is a top plan view of the carrier shown in Fig. 1;

Fig. 4 is a vertical section taken substantially upon the line 4—4 upon Fig. 3.

Referring to the accompanying drawing wherein similar reference characters designate similar parts throughout, B indicates a shopping bag which may be of any conventional or preferred construction. These shopping bags are usually formed of heavy paper or other inexpensive material and the side walls thereof are equipped with suspending or carrying cords C. The carrier or handle embodying the present invention comprises a tubular body generally indicated at 10, of suitable size and which preferably has the external surface thereof suitably rounded as indicated at 11. This body may be formed of wood, plastic or any other suitable material of adequate strength. In the body there is formed a helically arranged slot 12 extending from end to end thereof. The sides of this slot are so formed that they diverge outwardly as indicated at 13 and also inwardly as indicated at 14 from a throat 15 that is located or arranged approximately at the center of the wall thickness of the handle. The width of the throat 15 is but slightly in excess of the diameter of each of the cords C.

In use the cords C are consecutively passed through the helical slot 12 and throat 15 formed therein so that they occupy a position extending longitudinally through the handle as illustrated in Fig. 4. The handle forms a relatively wide or large bearing surface so that even though the bag B may be heavily loaded and carried for a considerable distance, the cords C will not have a tendency to cut into the hands of the person carrying the same. Inasmuch as the slot 12 is helically arranged, even though the handle may be turned so that the slot occupies a lowermost position, there is little danger of the cords inadvertently or accidentally slipping out of the slot. The natural position assumed by the cords is one parallel to the axis of the handle and as these cords thus transverse the slot at an angle, they will not slip outwardly therethrough. A conscious effort is required to position the cords parallel to the slot in order to move the cords inwardly or outwardly through slot 12. The divergent side walls 13 and 14 facilitate such movement when such a conscious effort is made.

From the above described construction it will be appreciated that the improved shopping bag carrier can be very inexpensively and economically produced and will adequately serve the purpose for which it is designed. As it is capable of being economically produced it is possible to use the carrier as an advertising medium to be given to purchasers complimentary with the purchases that they have made.

Various changes may be made in the details of construction without departing from the spirit or scope of the invention as defined by the appended claims.

I claim:

1. A shopping bag carrier comprising a tubular body having a helically arranged straight continuous slot extending from end to end thereof through which the cords of a shopping bag may be slipped to occupy positions extending through the tubular body, the width of the slot being smaller than the axial opening through the tubular body.

2. A shopping bag carrier comprising a tubular body having a helically arranged straight continuous slot extending from end to end thereof through which the cords of a shopping bag may be slipped to occupy positions extending through the tubular body, the sides of the slot diverging outwardly towards the outer surface of the body.

3. A shopping bag carrier comprising a tubular body having a helically arranged straight continuous slot extending from end to end thereof through which the cords of a shopping bag may be slipped to occupy positions extending through the tubular body, the sides of the slot diverging inwardly to the inner surface of the body.

4. A shopping bag carrier comprising a tubular body having a helically arranged straight continuous slot extending from end to end thereof through which the cords of a shopping bag may be slipped to occupy positions extending through the tubular body, the sides of the slot diverging outwardly and inwardly from a throat located intermediate the outer and inner surfaces of the body.

5. A shopping bag carrier comprising a tubular body having a straight continuous slot formed therein extending from end to end thereof, said slot being arranged at an angle to the axis of the tubular body, the width of the slot being smaller than the axial opening through the tubular body.

CHARLES A. GOZA.